US005692762A

United States Patent [19]

Obitts

[11] Patent Number: 5,692,762
[45] Date of Patent: Dec. 2, 1997

[54] WALKER WITH GLIDE ASSEMBLY

[75] Inventor: Shane Obitts, Elyria, Ohio

[73] Assignee: Invacare Corporation, Elyria, Ohio

[21] Appl. No.: 494,375

[22] Filed: Jun. 26, 1995

[51] Int. Cl.$^6$ ........ B62M 1/00

[52] U.S. Cl. ........ 280/87.05; 280/87.01

[58] Field of Search ........ 280/87.01, 87.021, 280/87.03, 87.041, 87.051, 87.05; 135/0.67; 16/35

[56] References Cited

U.S. PATENT DOCUMENTS

| | | | |
|---|---|---|---|
| 4,168,841 | 9/1979 | Uhlyarik | 280/28.11 |
| 4,747,180 | 5/1988 | Screen | 16/35 |
| 4,800,910 | 1/1989 | Gamm | 135/67 |
| 4,946,058 | 8/1990 | Stamm | 220/23.83 |
| 5,086,798 | 2/1992 | Motts | 135/67 |
| 5,112,044 | 5/1992 | Dubats | 482/68 |
| 5,133,377 | 7/1992 | Truxillo | 135/67 |
| 5,224,506 | 7/1993 | Allen et al. | 135/67 |

FOREIGN PATENT DOCUMENTS

| | | | |
|---|---|---|---|
| 0214755 | 10/1909 | Germany | 280/28.11 |

*Primary Examiner*—Brian L. Johnson
*Assistant Examiner*—Jonathan E. Butts
*Attorney, Agent, or Firm*—Fay, Sharpe, Beall, Fagan, Minnich & McKee

[57] ABSTRACT

A walker is provided with a non-rotatable glide assembly that easily slides over the ground surface when a walker is lifted and advanced forwardly. As soon as a predetermined downward force is exerted on the walker legs, the glides retract and non-slip crutch tips engage the ground surface. Moreover, an individual glide may be easily removed and substituted by a wheel that provides rolling contact with the ground surface. The remainder of the mounting structure is used so that the walker may be easily converted from a glide to wheeled arrangement.

19 Claims, 3 Drawing Sheets

WALKER WITH GLIDE ASSEMBLY

BACKGROUND OF THE INVENTION

This invention pertains to the art of patient aid devices and, more particularly, to a walker. The invention is particularly applicable to a glide assembly and a convertible glide assembly/wheel brake assembly on a collapsible walker having a pair of wheels mounted on base portions of a pair of front legs and will be described with particular reference thereto. However, it will be appreciated that the walker need not be collapsible, may not employ wheels of the type as shown in the preferred embodiment, or may not adopt all aspects of the preferred glide assembly/wheel brake assembly as described below.

Walkers are well known in the art and are typically used by patients or the elderly who require assistance in supporting themselves as they walk. Usually, the walker includes a lightweight frame, such as an aluminum tubular construction, in which four spaced legs extend downwardly from a pair of hand grip regions. The patient grasps the walker or supports himself on the hand grip regions, lifts and repositions the walker to a new location in front of him, and then steps forward transferring some of his weight to the walker during this process. These steps are repeated so that a patient becomes more ambulatory and increases self assurance of walking on his own.

Although manufacturers currently provide a walker that is lightweight, some patients still have difficulty in fully lifting the walker off the ground and advancing it to a new location. Rubber, crutch-like tips are often employed on two or more of the base portions of the four legs to provide a secure, non-slip support on each leg. If the patient, however, is unable to adequately lift the walker, the leg tips may, in fact, hamper the ability to effectively use the walker.

It is also generally known in the art to use retractable wheels that are biased outwardly and contact the ground surface when little or no downward force, e.g., the patient's weight, is exerted on the walker. As the patient's weight is transferred to the walker during the stepping process, the wheels retract and the leg tips engage the ground surface. One example of such a walker with selectively retractable wheels on the front legs of the walker is shown in U.S. Pat. No. 4,800,910.

Even then, walkers that use a pair of wheels can still be difficult for some patients to use since the rear legs engage the ground surface via the anti-slip crutch tips. Thus, although walkers having a pair of wheels (irrespective of whether the wheels are retractable, fixed, or castered) offer advantages over non-wheeled walkers with four, non-slip leg tips, the same general problems are encountered with the wheeled walkers. Users still must lift the rear legs off the ground surface or consequently the leg tips may interfere with smooth, forward movement of the walker.

Accordingly, it is deemed desirable to provide a walker that has improved features for assisting a patient.

SUMMARY OF THE INVENTION

The present invention contemplates a new and improved walker that overcomes the above-referenced problems and others and provides a lightweight, improved walker that is simple in construction, economical to manufacture, and easily converted between a glide assembly and a four-wheeled assembly.

According to the present invention, there is provided a walker having a frame with spaced apart first, second, third, and fourth legs. Two of the legs have non-rotatable glide members that extend axially outward beyond terminal or lower ends of the respective legs so that the walker can be easily advanced without having to fully lift the walker off the ground surface.

According to another aspect of the invention, the glide members are provided on the rear legs while the front legs each have a wheel received on lower ends thereof.

According to still another aspect of the invention, the glide members may be removed and substituted with additional wheels on the rear legs.

According to yet another aspect of the invention, the glide members are biased outwardly and retract when a predetermined force is imposed on the walker.

A principal advantage of the invention is to enhance the maneuverability of the walker.

Yet another advantage of the invention resides in the ability to substitute the glide members with a pair of wheels.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
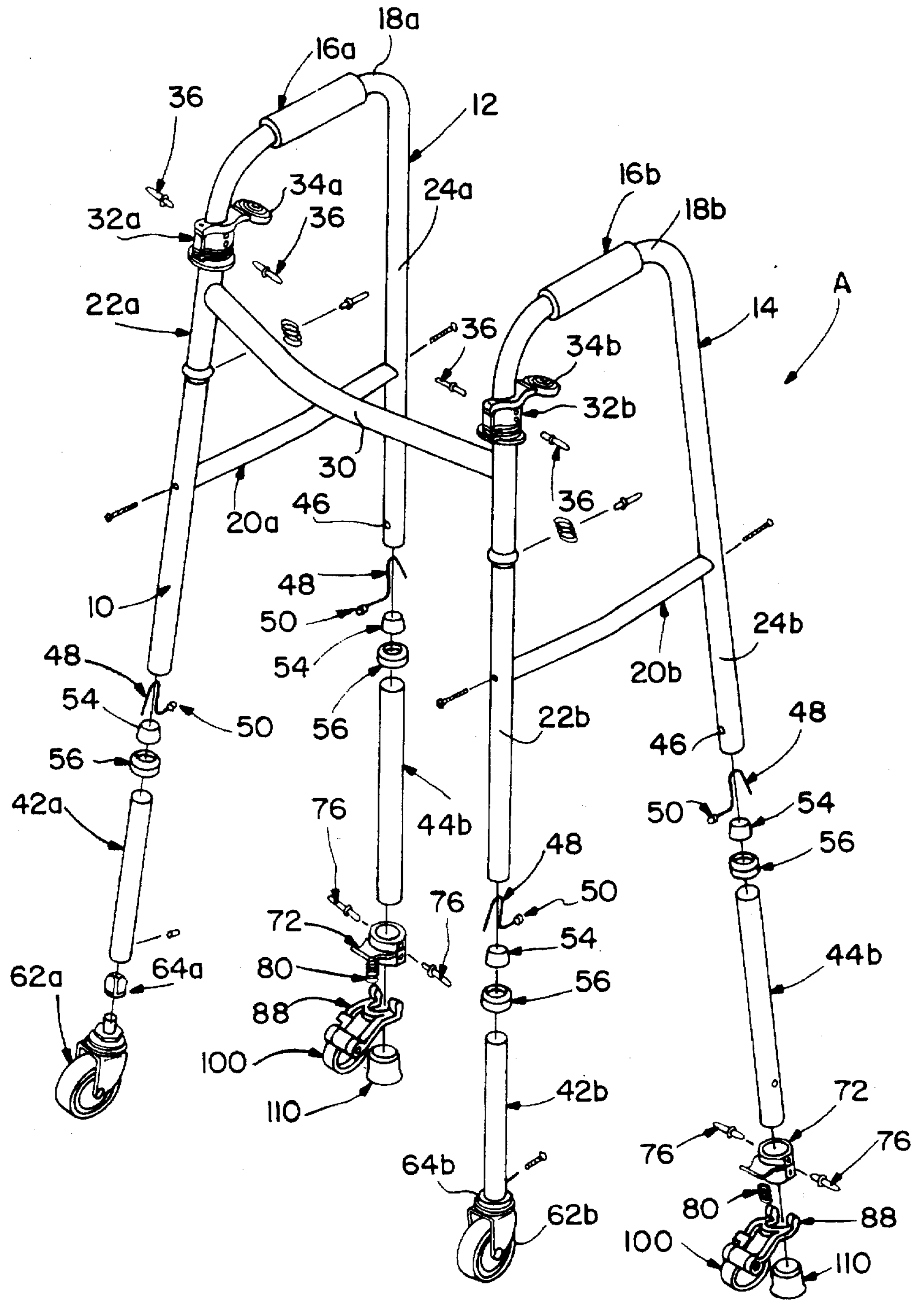
FIG. 1 is an exploded perspective view of a walker formed in accordance with the teachings of the subject invention.

Referring now to the drawings wherein the showings are for purposes of illustrating the preferred embodiment of the invention only and not for purposes of limiting same, the FIGURES show a walker A constructed in accordance with the teachings of the subject invention. More specifically, the walker includes a frame 10 that is comprised of a pair of mirror image side frames 12, 14. Hand grip regions **16*a*, 16*b* are provided at upper support regions 18*a*, 18*b* of each side frame. Spaced from the hand grips are side braces 20*a*, 20*b* which extend transversely between a pair of downwardly extending legs, more specifically, first and second or front legs 22*a*, 22*b*, and third and fourth or rear legs 24*a*, 24*b***. Each side frame is of substantially identical construction, and to facilitate identification, like elements are referred to by like numerals with an a or b suffix, while new elements are identified by new numerals.

A cross brace 30 interconnects the front legs 22a, 22b together. Although shown in a deployed or in use position, a pair of handle releases 32a, 32b are received on each front leg so that when handle 34a, 34b is actuated, the side frames 12, 14 can be rotated inwardly toward one another into a collapsed position (not shown) against the cross brace 30 for storage purposes. Each of the handles 32a, 32b is secured to the side frames by suitable fastening means, such as pop rivets 36. More particular details of the collapsible structure and its operation are not provided since they are well known in the art and form no part of the subject invention.

To provide for height adjustment, each of the legs includes a telescoping assembly along its lower portion. More specifically, adjustable leg portions 42a, 42b (front) and 44a, 44b (rear) are provided, one leg portion for each leg. In the preferred arrangement, the adjustable legs are tubular constructions of slightly greater diameter than the remainder of the legs. In this manner, the adjustable leg portions are slidably received over the lower ends of the respective legs.

Figure 4:
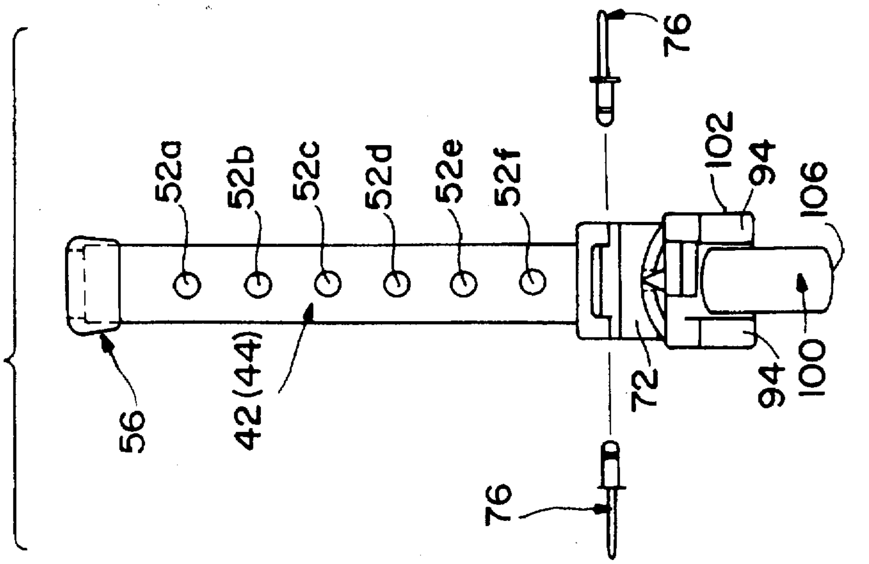
FIG. 4 is an elevational view taken generally along the lines 4—4 of FIG. 2.
Figure 3:
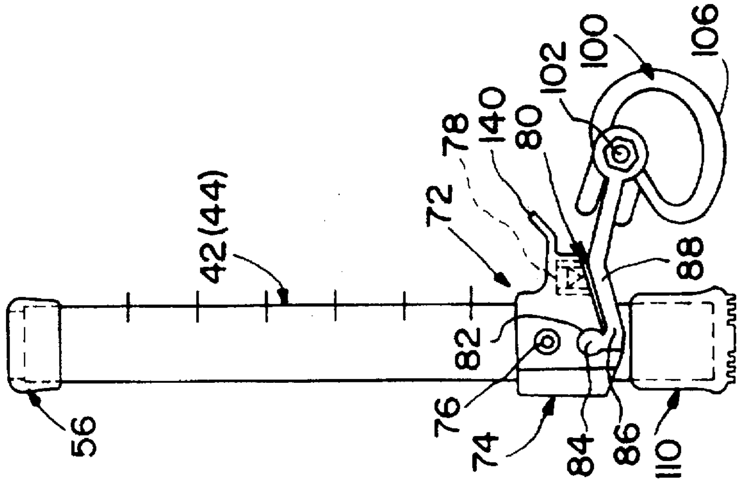
FIG. 3 is an elevational view similar to FIG. 2 and illustrating the pivoting action of the glide member when a predetermined downward force is imposed on the walker.
Figure 2:
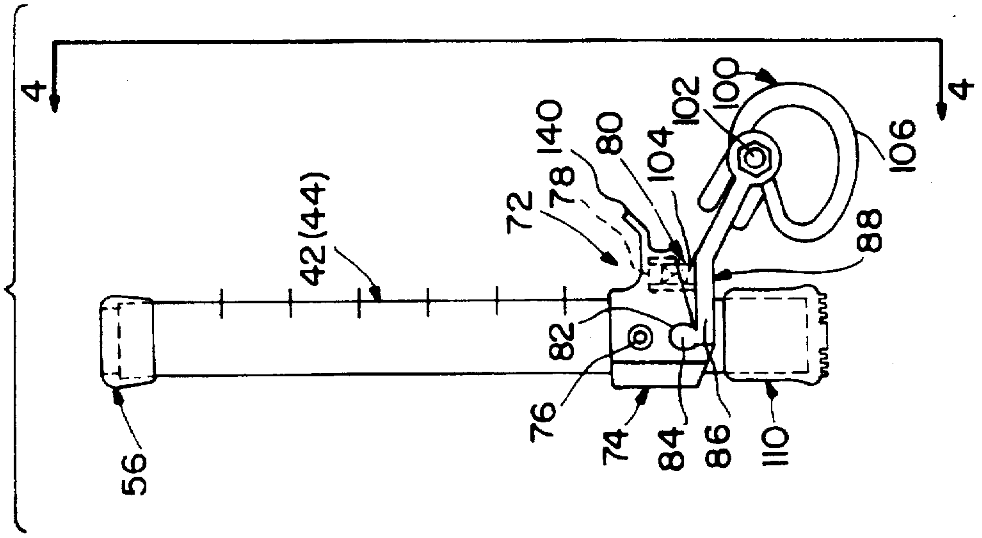
FIG. 2 is an elevational view of a lower portion of one of the legs having a glide member extending outwardly therefrom.
Figure 5:
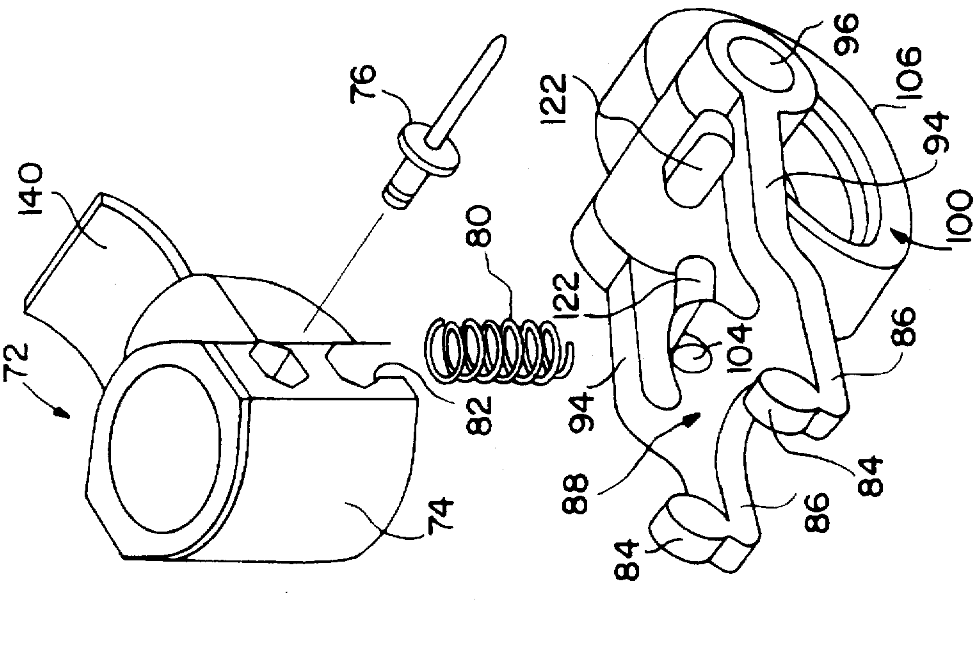
FIG. 5 is an exploded, perspective view of a preferred glide assembly.

To selectively lock the adjustable leg portions in place, i.e., at a desired height, an opening 46 is provided adjacent the lower end of each of the legs 22, 24, Disposed within the hollow tubular leg is a snap button assembly, which according to the preferred arrangement is comprised of a wire spring 48 and a snap button 50. The bent configuration of the wire spring secures the assembly in place within the hollow tubular leg and biases the snap button S0 outwardly through the respective opening 46. As shown, each leg includes its own snap button assembly so that the lengths of all legs may be adjusted to alter the height of the walker. As perhaps best illustrated with reference to FIG. 4, a series of axially spaced openings 52a–f are provided in each adjustable leg portion. These openings are dimensioned to receive the snap button therethrough when the desired opening is aligned over the snap button extending through opening 46 of a respective leg. By selectively depressing the snap button, the adjustable leg portions are then slid upwardly or downwardly on the lower ends of the legs to adjust the height. The biasing action provided by the wire spring urges the snap button 50 outwardly through aligned openings 46, 52 to secure the adjustable leg at the desired height.

Turning again to FIG. 1, it is important to provide relative sliding movement between the adjustable leg portions and the remainder of the legs. However, too loose a fit provides an undesirable rattle between the telescoping components. Accordingly, an anti-rattle plug 54 is inserted into and closes off the lower ends of the hollow tubular legs. Additionally, an anti-rattle collar 56 is received over an upper end of each of the adjustable leg portions 42, 44. Preferably, the anti-rattle components 54, 56 are formed from plastic or similar material that exerts a close-forming fit on the components, allowing sliding movement without an attendant rattle.

As shown in the preferred embodiment of FIG. 1, each of the front leg portions 42 receives a caster wheel 62. Each caster wheel is secured to a lower end of the adjustable leg portion by means of an adaptor bushing 64. As is well known in the art, the caster wheel assembly provides for free rotational movement through 360° about a vertical axis. Thus, the patient can easily steer the walker and the casters will rotate in the desired direction in response to the applied forces. Of course, it will be recognized that fixed wheels, i.e., unable to rotate about a vertical axis, are sometimes used in place of the caster wheels.

With continued reference to FIG. 1, and additional reference to FIGS. 2–5, there is shown a glide assembly 70 disposed on each rear leg, particularly on the adjustable leg portions 44 thereof. Thus, although only one adjustable leg portion of a rear leg is illustrated in FIGS. 2–5, the other rear leg accommodates a glide assembly also and the description of one is equally applicable to the other. Each glide assembly includes a spring housing 72 having a circumferentially continuous cylinder or collar 74 (FIG. 5) which is secured to the adjustable leg portion by a fastener, such as pop rivet 76. A recess or cavity 78 is adapted to receive a spring, such as coil spring 80, therein. The cavity is dimensioned to receive one end of the coil spring, while another end of the coil spring extends outwardly, preferably downwardly from the spring housing.

Also formed in the spring housing 72 are a pair of generally key-shaped openings or recesses 82 that are located on diametrically opposite portions of the spring housing. These openings face generally downward and receive rounded or bulbous ends 84 of a pair of arms 86 of fork assembly 88. Also provided on the fork assembly 88 are a second pair of arms or forks 94. Each fork arm 94 has an opening 96 at an outer end that defines a pivot axis for limited pivotal movement of glide member 100. A pin member 102 is received along the axis to secure the glide member to the fork assembly.

A protrusion or raised dimple 104 is also defined on the fork assembly 88. The protrusion receives the other end of the coil spring 80 so that the glide member 100 is normally biased downward, exerting the spring biasing force against the fork assembly. Thus, the fork assembly is urged to pivot about the rounded end 84 in a generally clockwise direction as viewed in FIGS. 2 and 3 by the coil spring. In this manner, a smooth curvilinear base surface 106 of the glide member is urged into sliding contact with the ground surface. This contoured surface facilitates sliding movement of the entire walker over the ground surface, particularly where a patient would otherwise have a tendency to drag the legs along the ground surface, as opposed to a lifting action for each forward advancement of the walker.

Also provided on the lower end of the adjustable leg portions 44 is a crutch tip or other anti-slip surface 110. As described above, use of a non-slip tip on the base of a leg is a well known and commonly used feature. In the preferred arrangement, it is defined by a one-piece rubber structure that is tightly received over the end of the tubular leg and has a serrated lower surface that frictionally engages the ground surface. Since the structure and operation of these tips is well known in the art, further discussion is deemed unnecessary to a full and complete understanding of the invention.

The main pivoting action of the glide 100 is about the rounded end 84 of the fork assembly. Since the curvilinear surface 106 extends over a major portion of the glide member, only a small surface area of the glide contacts the ground surface at one time. Additionally, a pair of stops 12O, 122 are integrally molded with and extend outwardly from an upper surface of the glide 100. The stops 120, 122 cooperate with the top side and underside, respectively, of the pair of fork arms 94. The stops allow only a limited degree of pivotal movement of the glide about the pin member 1O2 and primarily function to maintain the proper orientation of the curvilinear surface 106 toward the ground surface. Of course, alternative arrangements may be used without departing from the scope and intent of the subject invention.

Figure 6:
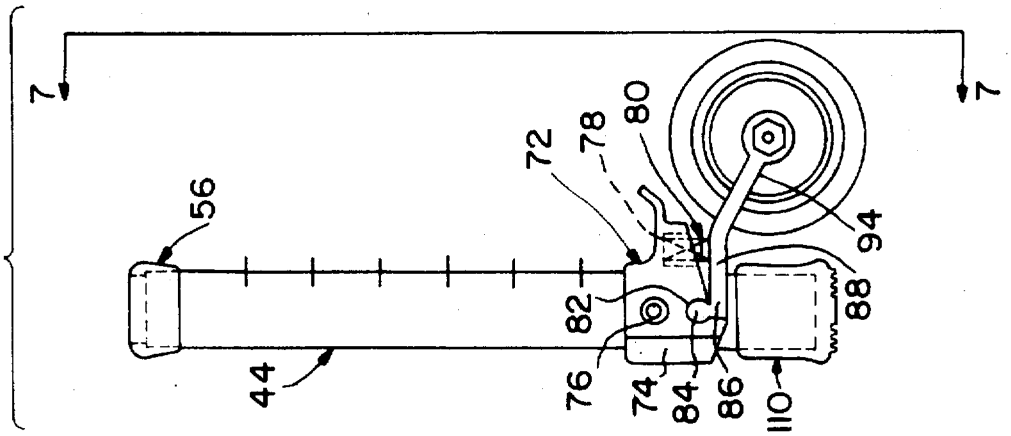
FIG. 6 is an elevational view similar to that of FIG. 2 in which the glide member has been substituted by a wheel.
Figure 7:
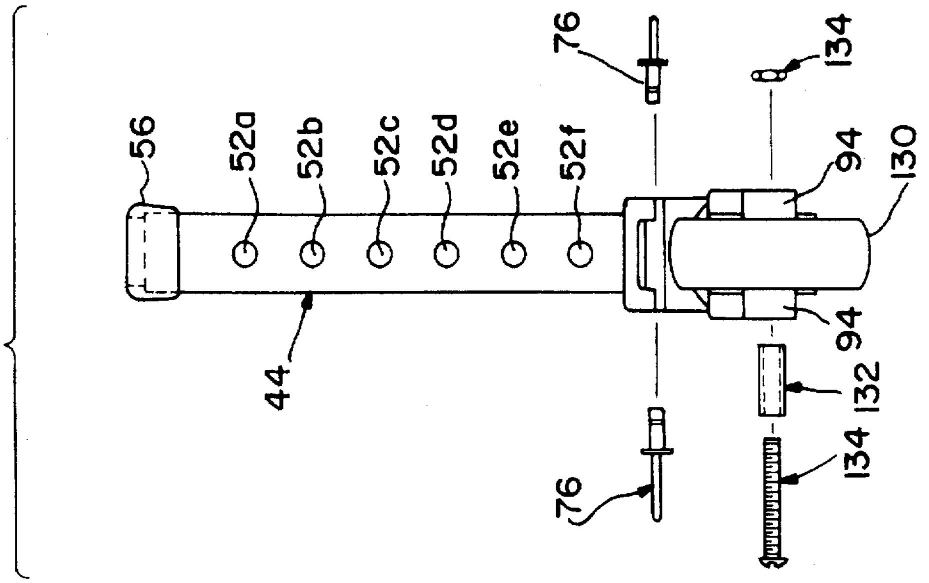
FIG. 7 is an elevational view taken generally along the lines 7—7 of FIG. 6.

As additionally shown in FIGS. 6 and 7, the glide member 100 may be easily removed and substituted with a wheel 130. Removal of pin member 102 from the openings in the ends of the fork arms 94 allows the glide member 100 to be slid outwardly from receipt between the arms in the fork assembly. Thereafter, a wheel 130 is positioned between the fork arms. A journal 132 and a removable fastener, such as a nut and threaded bolt assembly 134, that is received through the journal, cooperate to hold the wheel in place.

As will be apparent, the remainder of the glide assembly structure is retained on the lower portion of the adjustable leg. That is, the spring housing, fork assembly, spring, and crutch tip all operate in substantially the same way. The wheel 130, however, is adapted for rotation about a horizontal axis defined by the fastener whereas the glide member did not rotate. Thus, the wheel 130 is normally biased by the spring into rolling contact with the ground surface until a predetermined force is exerted on the walker leg. This force overcomes the outward bias of the spring 80 and the wheel pivots upwardly about the rounded end 84 of the fork assembly so that the crutch tip 110 engages the ground surface. As soon as the downward force is removed, the spring 80 returns the wheel into contact with the ground surface and the crutch tip is lifted upwardly.

A tab 140 extends outwardly from the spring housing and is disposed outwardly of the spring 80 in a location overlying the wheel. The tab acts as a secondary support for the assembly to prevent the fork arms from being overstressed. That is, the arms 86 engage the spring housing as the assembly pivots about end 84 relative to the spring housing. If the tip could proceed further downwardly than the wheel, for example if the wheel is supported by a curb or step and the tip is located over the edge of the curb, additional stresses could be imposed on arms 94 of the assembly. The tab 140, however, will engage the wheel and prevent further upward deflection of the fork assembly relative to the spring housing.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A walker for assisting a person while walking, the walker comprising:

a frame having downwardly extending first, second, third and fourth legs and first and second regions adapted to support a user;

the first and second legs each having a wheel received on a lower end thereof adapted to roll over a ground surface;

the third and fourth legs each including a tip having a non-slip surface thereon for stabilizing the walker; and first and second glides received on the third and fourth legs, respectively, and normally extending outwardly beyond the tips, the glides having smooth surfaces for traversing the ground surface so that the walker can be easily advanced over the ground surface until a predetermined force is exerted on the walker, wherein the glides each include a fork extending from the respective legs, one end of each fork being pivotally mounted to the respective leg and an other end being pivotally mounted to a curvilinear surface that faces the ground surface.

2. The walker as defined in claim 1 further comprising first and second springs operatively associated with the first and second glides for biasing the glides beyond the tips and toward the ground surface.

3. The walker as defined in claim 1 further comprising third and fourth wheels adapted for mounting on the third and fourth legs, respectively, when the glides are removed from the third and fourth legs.

4. The walker as defined in claim 3 wherein each glide is mounted to a fork extending from the third and fourth legs by a pin member and the third and fourth wheels are mounted to the respective forks.

5. The walker as defined in claim 1 wherein each glide includes a spring housing secured to the respective third and fourth leg and a spring interposed between the spring housing and the glide for urging the glide toward the ground surface.

6. A walker for assisting a person while walking, the walker comprising:

a frame having spaced apart first, second, third and fourth legs, and a pair of hand grip regions;

first and second wheels operatively received on lower ends of the first and second legs, respectively;

the third and fourth legs including first and second tips, respectively, adapted to selectively contact the ground surface; and first-and second plastic glides extending outwardly from the third and fourth legs respectively, and having a smooth, curvilinear contact surface facing the ground.

7. The walker as defined in claim 6 further comprising third and fourth wheels that may be removably interchanged with the glides, respectively.

8. The walker as defined in claim 6 wherein each glide includes first and second forks extending from the third and fourth legs, respectively, and adapted to alternately receive either the glides or third and fourth wheels.

9. The walker as defined in claim 8 further comprising first and second members for alternately mounting the glides or third and fourth wheels to the third and fourth legs.

10. The walker as defined in claim 6 further comprising a spring for urging the glides outwardly from the third and fourth legs.

11. The walker as defined in claim 6 wherein the first and second legs are disposed at a front end of the walker and the third and fourth legs are disposed at a rear end of the walker, the glides extending outwardly from the third and fourth legs toward the first and second legs respectively.

12. The walker as defined in claim 6 wherein the glide is pivotally mounted to the third and fourth legs, respectively.

13. The walker as defined in claim 12 wherein the glides each include a spring housing secured to one of the third and fourth legs, respectively, and first and second springs operatively associated therewith for urging the glides toward the ground surface.

14. A walker for assisting a person that has difficulty lifting the walker and advancing it forward, the walker comprising:

a frame having downwardly extending first, second, third, and fourth legs and first and second regions adapted to support a person using the walker;

the first and second legs each having a wheel mounted thereon adapted for rolling contact with the ground;

the third and fourth legs each having a glide biased outwardly by a spring from a tip of the leg that has a non-slip surface so that the walker is partially supported by the glides until a predetermined downward force is imposed thereon and the non-slip surfaces are then urged to engage the ground, the glides each having a contoured smooth surface that slides over the ground and has a stop member that limits pivotal rotation of the glide.

15. The walker as defined in claim 14 further comprising first and second arms extending outwardly from the third and fourth legs respectively, the arms pivotally mounted to the respective leg at a first end and receiving the respective glides at a second end.

16. The walker as defined in claim 15 further first and second collars non-rotatably secured to the third and fourth legs, respectively, and receiving the first ends of the arms.

17. The walker as defined in claim 15 further comprising third and fourth wheels adapted for mounting on the third and fourth legs, respectively, when the glides are removed from the third and fourth legs.

18. The walker as defined in claim 14 wherein the glides extend from the third and fourth legs toward the first and second legs.

19. The walker as defined in claim 17 wherein the third and fourth legs define the rear legs of the walker.

* * * * *